Patented Jan. 10, 1933

1,893,575

UNITED STATES PATENT OFFICE

GEORGE BACHARACH, OF NEW YORK, N. Y., AND EUGENE McCAULIFF, JR., OF YONKERS, NEW YORK, ASSIGNORS OF THIRTY PER CENT TO RADIO PATENTS CORPORATION, OF NEW YORK, N. Y., A CORPORATION OF NEW YORK

MANUFACTURE OF BENZANTHRONE

No Drawing. Application filed May 2, 1930. Serial No. 449,354.

This invention relates to the manufacture of benzanthrone, which is an important intermediary product used in the manufacture of dye stuffs, specifically of what are known as vat dyes.

The invention more particularly relates to an improvement of the well-known process, as employed in the art, for producing this substance and as described in detail in United States Patent #787,859. According to this known process, benzanthrone is prepared by the action of sulphuric acid and glycerine an anthraquinone or anthranol, which latter is a derivative of anthraquinone, at temperatures ranging from 130 to 180 deg. C.

This method, however, does not afford good yields of the final end product; that is, benzanthrone, primarily on account of excessive charring, which sets in even before the chemical reaction takes place and which is evidenced by the presence of a great amount of unchanged anthraquinone at the end.

Applicants have discovered that the excessive charring in this reaction, which appears to be the primary cause of the low yield, may be prevented by the addition of a chemical dehydrating agent, preferably of acetic anhydride. Applicants, furthermore, discovered that by using an additional chemical dehydrating agent, such as acetic anhydride, it is possible to reduce the quantity of sulphuric acid to a great extent, thus resulting in less charring and an increased yield of very pure benzanthrone.

Accordingly, an object of the present invention is to improve on the method of producing benzanthrone, by reacting sulphuric acid and glycerine on anthraquinone or anthranol, with an additional chemical dehydrating agent, such as acetic anhydride, so as to materially increase the yield of the benzanthrone obtained.

Another object is to improve the usual process, so as to obviate excessive charring and dispense with further purifying process, such as recrystallization, which, according to the older method, was necessary in order to obtain a sufficiently pure final product.

It has already been proposed to mix the sulphuric acid used in a process for making benzanthrone different from the specific process referred to in this invention with the organic solvent glacial acetic acid. Applicants found that when they choose a glacial acetic acid as a desolvent for the sulphuric acid, in his particular process this will not give any favorable result and the yield of benzanthrone is very poor. The problem, according to the invention, calls for a chemical dehydrating agent, such as acetic anhydride; that is, an agent which takes the elements of water away in the condensation process of glycerine and anthraquinone and, thus, converts itself into glacial acetic acid. By using glacial acetic acid from the start as a solvent for the sulphuric acid, this will act only as a dehydrate in a physical way, to take up moisture from a moist substance.

It has furthermore been proposed to use solid substances in connection with the process of making benzanthrones referred to in this invention, such as aniline sulphate. Applicants found that in this method the aniline sulphate acts as a catalyst, while acetic anhydride used in accordance with the invention, which serves as a diluent for the sulphuric acid, acts as a condensing agent with no charring as a result, which accounts for the exceptional purity of the resulting compound. The acetic anhydride used according to the invention tempers the reaction acting as a diluent for the sulphuric acid, but while it helps in the condensation, at the same time, it prevents the sulphuric acid from charring and enables an exceptionally high yield of the final product benzanthrone, which needs no further treatment, such as recrystallization.

Other objects will appear as the description progresses.

The preferred method of carrying out the process is as follows:— Seven parts of anthraquinone, ten parts of acetic anhydride, ten parts of glycerine and twenty parts of concentrated sulphuric acid are mixed and heated to 150 degrees C., for a period of four hours under reflux. At the end of this time, water is added to the cold product and the mixture filtered. The filtrate contains the sulphuric acid, as well as acetic acid, into which the acetic anhydride was converted. From this filtrate the acetic acid may be recovered. The black residue is extracted with hot alcohol, to which a small amount of animal charcoal is added and the solution filtered hot. From this filtrate the benzanthrone crystallizes out, upon cooling.

Experiments have shown that the yield is 80.5% of the theoretical value. The product melts from 168 to 170 degrees C., which corresponds to the pure product and, thus, no further recrystallization is necessary.

The invention, as described, is naturally subject to modifications of the data given, coming within the scope of the appended claims.

What we claim is:—

1. The process of manufacturing benzanthrone, which consists of:— (1) heating sulphuric acid, glycerine and anthraquinone, in the presence of acetic anhydride to 150 degrees C., (2) adding water to the cold product, (3) filtering the mixture and recovering the benzanthrone from the residue.

2. The process of manufacturing benzanthrone, which consists of:— (1) heating sulphuric acid, glycerine and anthraquinone, in the presence of acetic anhydride to 150 degrees C., (2) adding water to the cold product, (3) filtering the mixture and recovering the benzanthrone from the residue, by (4) extracting the same with hot alcohol, to which a small amount of charcoal is added, (5) filtering the solution hot, (6) allowing the benzanthrone to crystallize out upon cooling.

3. The process of manufacturing benzanthrone, which consists of:— (1) mixing and heating seven parts of anthraquinone, ten parts of acetic anhydride, ten parts of glycerine and twenty parts of concentrated sulphuric acid to 150 degrees C. (2) adding water to the cold product, (3) filtering the mixture and recovering the acetic acid from the filtrate and producing the benzanthrone, by (4) extracting the residue with hot alcohol, to which a small amount of charcoal is added, (5) filtering the solution hot, (6) allowing the benzanthrone to crystallize out upon cooling.

In testimony whereof we affix our signatures.

GEORGE BACHARACH.
EUGENE McCAULIFF, Jr.